(No Model.)  T. B. HUSSEY.  2 Sheets—Sheet 1.
HARROW ATTACHMENT.

No. 418,517.  Patented Dec. 31, 1889.

Witnesses  Inventor
Fred. Heller.  Timothy B. Hussey
W. S. Odell  By Daniel Breed, Attorney (No Model.) 2 Sheets—Sheet 2.
T. B. HUSSEY.
HARROW ATTACHMENT.

No. 418,517. Patented Dec. 31, 1889.

Witnesses
Fred Keller.
W. S. Odell

Inventor
Timothy B. Hussey
By Daniel Breed Attorney

N. PETERS, Photo-Lithographer, Washington, D. C.

UNITED STATES PATENT OFFICE.

TIMOTHY B. HUSSEY, OF NORTH BERWICK, MAINE.

HARROW ATTACHMENT.

SPECIFICATION forming part of Letters Patent No. 418,517, dated December 31, 1889.

Application filed April 10, 1888. Serial No. 270,160. (No model.)

*To all whom it may concern:*

Be it known that I, TIMOTHY B. HUSSEY, a citizen of the United States, residing at North Berwick, in the county of York and State of Maine, have invented certain new and useful Improvements in Harrow Attachments; and I do hereby declare the following to be a full, clear, and exact description of the invention, such as will enable others skilled in the art to which it appertains to make and use the same.

My invention consists of certain new combinations of devices in harrow attachments, which will be fully understood by the following description and claim, reference being had to the accompanying drawings, forming part of this specification.

Figure 1:
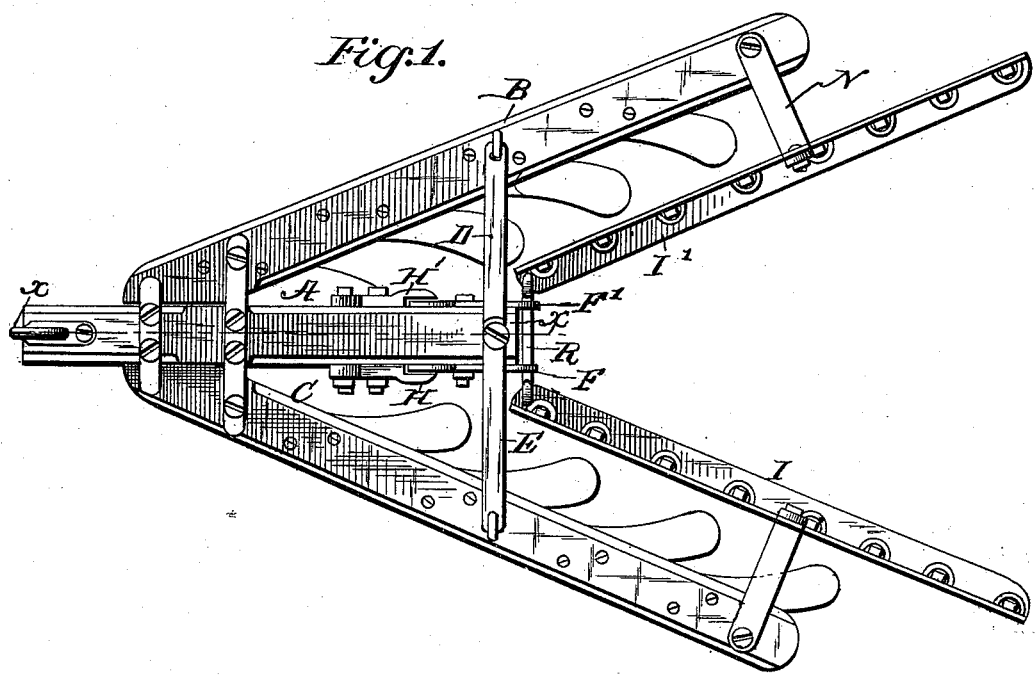
Figure 2:
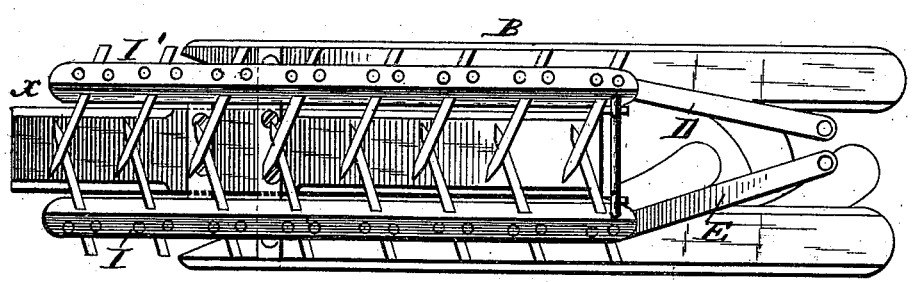
Figure 3:
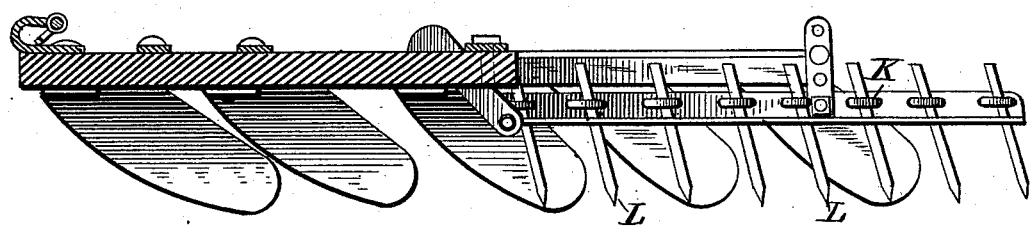
Figure 4:
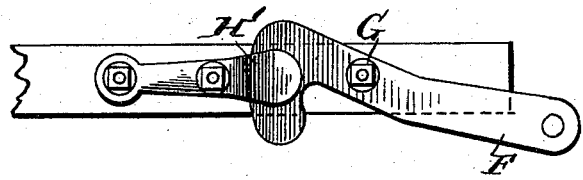
Figure 5:
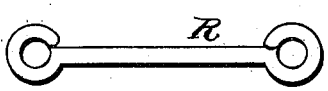
Figure 6:
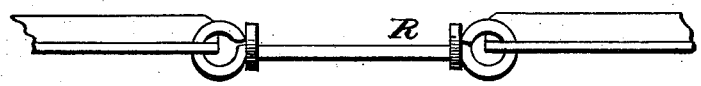
Figure 7:
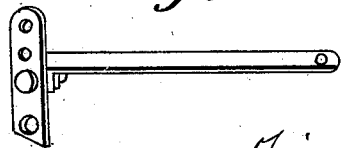

In the drawings, Figure 1 is a top view or plan of a harrow with my improved attachment connected therewith in working position. Fig. 2 is a top plan of the harrow with the wings thereof swung together for transportation, and with the attachment folded over upon the top of the harrow by having the rear end of the attachment first raised and then swung over, describing a vertical semicircle, so as to lie upon its back and also upon the back of the harrow. Fig. 3 is a vertical longitudinal and central section of both harrow and attachment on the line X X, Fig. 1. Figs. 4, 5, 6, and 7 are detached views.

In the construction and use of my invention any ordinary harrow may be employed; but I prefer the harrow represented in the drawings, and for which I have secured a patent of the United States. The frame of this harrow has a central bar A, to which are pivoted the wings B and C by means of pivots *b* and *c*, so as to be capable of swinging inward, as shown in Fig. 2. When in working position, as shown in Fig. 1, the wings are held in place by braces D and E.

On the rear end of bar A are two curved straps or levers F and F', pivoted by means of bolt G, so that their rear ends may be raised or lowered in order to elevate or depress the attachment when desired. These levers are provided with friction-clamps H and H' to lock the levers in place and support the attachment at the proper elevation.

The attachment-bars I and I' are made of angle-irons and provided with staples or eyes K for holding the teeth L, which are inserted through holes in the gang-bars, as seen in Figs. 2 and 3. These gang-bars are fastened to the harrow by means of eye-rod R R, Fig. 5. (Better shown in Fig. 6.) By this arrangement the gang-bars have a free movement and may be swung in and out, also rotated, and the rear ends may be raised and describe a vertical semicircle, thus bringing their rear ends in front and laying the attachment upon the top of the harrow, as seen in Fig. 2.

The braces N and M serve to steady the gang-bars and hold the teeth in working position.

Having thus described my invention, what I claim is—

In harrow attachments, the central bar A, in combination with the adjustable levers F and F', the eye-rod R, and the attachment-bars I and I', substantially as and for the purpose set forth.

In testimony whereof I affix my signature in presence of two witnesses.

TIMOTHY B. HUSSEY.

Witnesses:
ARTHUR M. HUSSEY,
WM. T. HUSSEY.